US007385150B1

(12) United States Patent
Siddiqui et al.

(10) Patent No.: US 7,385,150 B1
(45) Date of Patent: Jun. 10, 2008

(54) SLIDING MECHANISM FOR DEVICE WITH TWO KEYBOARDS

(75) Inventors: Kabir Siddiqui, Sammamish, WA (US); Dane Howard, Ross, CA (US); Catherine Kim, Seattle, WA (US); Chris Robert Towers, Seattle, WA (US); Claude Zellweger, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/646,666

(22) Filed: Dec. 28, 2006

(51) Int. Cl.
*H01H 9/00* (2006.01)
*H01M 1/00* (2006.01)

(52) U.S. Cl. .................... 200/5 A; 361/680; 455/575.4

(58) Field of Classification Search ................ 200/5 R, 200/5 A, 310–317, 333; 341/20, 22; 345/156, 345/168–170, 173; 361/680; 379/422, 428.01–433.07, 379/433.11–433.13; 455/575.1–575.8
See application file for complete search history.

(56) References Cited

U.S. PATENT DOCUMENTS

| | | | | |
|---|---|---|---|---|
| 6,088,220 A | * | 7/2000 | Katz | 361/680 |
| 6,483,445 B1 | * | 11/2002 | England | 341/22 |
| 6,728,558 B1 | * | 4/2004 | Kubo et al. | 455/575.4 |
| 6,794,588 B2 | * | 9/2004 | Lin | 200/5 A |
| 6,856,327 B2 | | 2/2005 | Choi | |
| 7,016,182 B2 | * | 3/2006 | Brandenberg et al. | 361/683 |
| 7,076,058 B2 | * | 7/2006 | Ikeuchi et al. | 379/433.12 |
| 7,085,590 B2 | | 8/2006 | Kennedy et al. | |
| 7,099,708 B2 | | 8/2006 | Ronkko | |
| 7,110,797 B2 | * | 9/2006 | Soejima | 455/575.1 |
| 7,142,420 B2 | * | 11/2006 | Santos et al. | 361/686 |
| 7,187,364 B2 | * | 3/2007 | Duarte et al. | 345/168 |
| 7,199,313 B1 | * | 4/2007 | Kemppinen | 200/5 A |
| 7,200,429 B2 | * | 4/2007 | Park et al. | 455/575.4 |
| 7,220,925 B2 | * | 5/2007 | Kubo et al. | 200/5 A |
| 2003/0013417 A1 | | 1/2003 | Bum | |
| 2003/0157957 A1 | | 8/2003 | Wendorff et al. | |

(Continued)

FOREIGN PATENT DOCUMENTS

WO    WO2005027089 A1    3/2005

OTHER PUBLICATIONS

Fussell et al., "Accessing Multi-Modal Information On Cell Phones While Sitting And Driving", http://www.cs.cmu.edu/~sfussell/pubs/Manuscripts/HFES02-CellPhones-Final.pdf.

*Primary Examiner*—Michael A. Friedhofer
(74) *Attorney, Agent, or Firm*—Russell S. Krajec; Krajec Patent Offices, LLC

(57) ABSTRACT

A device has a moving display that alternatively hides two keyboards. As the display is moved to expose one keyboard, the device may take on different functionality than when the other keyboard is exposed. The sliding mechanism has a back plate with two guides, onto which are mounted the two keyboards. A sliding plate engages has at least two legs that engage the guides. Electrical signals are passed from components attached to the sliding plate to components attached to the back plate through signals routed along one of the sliding plate legs. A loop of cable is able to roll beneath the keyboard when the sliding plate is moved from one position to another. A spring may also be used between the sliding plate and back plate to hold the sliding plate at either extreme of its travel.

20 Claims, 6 Drawing Sheets

U.S. PATENT DOCUMENTS

| | | |
|---|---|---|
| 2004/0230370 A1 | 11/2004 | Tzamaloukas |
| 2005/0020325 A1 | 1/2005 | Enger et al. |
| 2005/0288075 A1 | 12/2005 | Geemaert |
| 2006/0105806 A1 | 5/2006 | Vance et al. |
| 2006/0148517 A1 | 7/2006 | Yu |
| 2006/0229117 A1 | 10/2006 | Lehtonen |

\* cited by examiner

SLIDING MECHANISM FOR DEVICE WITH TWO KEYBOARDS

BACKGROUND

Handheld devices, such as cellular telephones, personal digital assistants, media players, and other devices are becoming increasingly integrated and multi-functioned. The ubiquitous cellular telephone can have integrated calendar, email, and audio or video playback features.

Many such devices have movable parts, such as a hinge or slide. Moving components have many constraints placed on them, including high life cycle requirements and durability requirements, all the while maintaining electrical and mechanical connections.

SUMMARY

A device has a moving display that alternatively hides two keyboards. As the display is moved to expose one keyboard, the device may take on different functionality than when the other keyboard is exposed. The sliding mechanism has a back plate with two guides, onto which are mounted the two keyboards. A sliding plate engages has at least two legs that engage the guides. Electrical signals are passed from components attached to the sliding plate to components attached to the back plate through signals routed along one of the sliding plate legs. A loop of cable is able to roll beneath the keyboard when the sliding plate is moved from one position to another. A spring may also be used between the sliding plate and back plate to hold the sliding plate at either extreme of its travel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
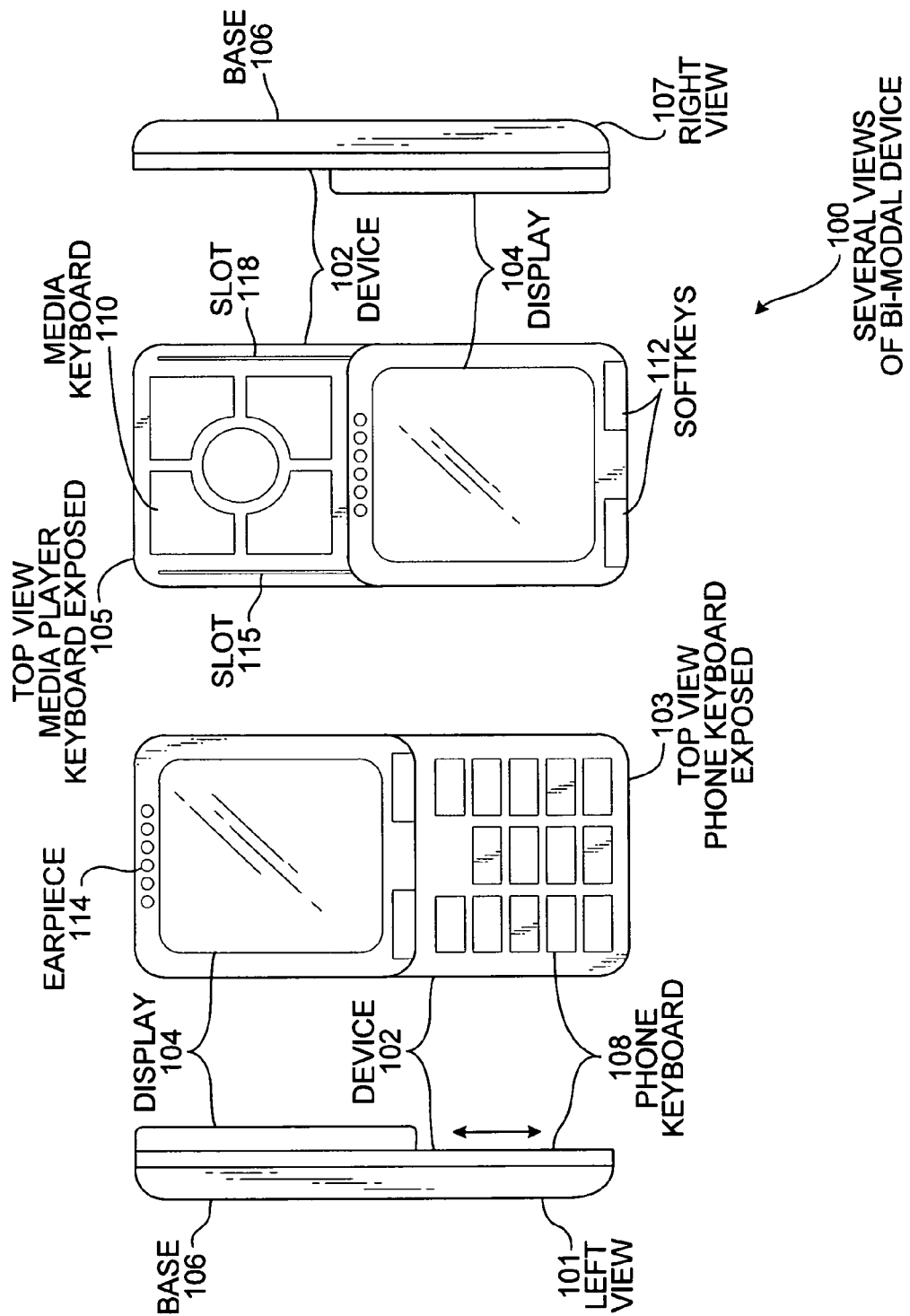
FIG. 1 is a pictorial illustration of an embodiment showing several views of a bi-modal device.

A multi-modal device, such as a combined cellular telephone and media player, can be switched from one mode to another by sliding a display from a first position to a second position. In the first position, the keyboard for one mode is exposed, such as the cellular telephone mode. In the second position, the keyboard for the other mode is exposed while the first keyboard is hidden.

The sliding action may be accomplished by having a sliding plate connected to a back plate. The sliding plate may mechanically connect to the back plate on two arms, and a flexible electrical connection may connect electrical components on the sliding plate to those on the back plate. A spring may also be used to apply retention force in either position. An electronic sensor, such as a mechanical switch, may be used to detect the position of the sliding plate with respect to the back plate and enable the device to enter an appropriate operating mode.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing four views of a bi-modal device. The left view 101 of a device 102 shows a display 104 in an upper position relative to a base 106 and a keyboard 108 is exposed. The top view 103 shows the display 104 from a user's point of view and the keyboard 108 exposed. The view 105 shows the device 102 with the display 104 in a lower position, such that a media keyboard 110 is exposed. The display 104 slides with respect to the base 106 through slots 114 and 116. The right view 107 shows the device 102 with the base 106 and the display 104 in a position to expose the media keyboard 110.

The device 102 may be any type of multi-modal device. For example, the device 102 may be a combination telephony device in one mode and a music player, video player, image viewer, camera, or any other type of device in another mode. When a user wishes to switch modes, the user may slide the display 104 from one position to another, exposing the appropriate keyboard for the mode.

For example, if a user is operating a combination media player and cellular telephone in the media mode, the media keyboard 110 may be exposed. Using the media keyboard 110, certain functionality such as selecting, playing, and pausing the media could be executed. When the device receives an incoming telephone call, the user may slide the display 104 to the telephony mode, exposing the phone keyboard 108, and answer the call or perform another function relating to the call. In a telephony mode, the sliding display 104 may include an earpiece 114.

The sliding display 104 may include one or more softkeys 112 that may perform the same or different functions in multiple modes. For example, the softkeys 112 may be used to make menu selections from the display 104 in both modes of operation. In another example, the softkeys 112 may perform a specific function in a telephony mode, such as starting or ending a telephone call, while functioning as volume keys in a media playback mode.

The display 104 connects to the base 106 through two mechanical arms (not shown) that extend through the slots 115 and 116. Along one or both of the arms, a flexible circuit connection may connect electronic components on the sliding display 104 with electronic components in the base 106. A spring mechanism may be used to hold the display 104 in either of the two positions with some retention force.

A sensor may be used to detect the current position of the display 104 relative to the base 106. The sensor may be a simple mechanical switch mounted to detect the display 104 in one position. Some implementations may use two such switches, one to detect each position. The sensor may be any other type of sensor, including optical, capacitive, or any other sensor arranged to detect at least one position of the display 104.

As the device is moved from one position to another, software and/or hardware within the device may change operating functions, change the user interface on the display, or otherwise modify functions based on the position of the display 104. For example, moving the display 104 from the position of view 103 to the position of view 105, the device may change modes into a media player. Some functions of a telephony device may still be operable, so that the device 102 may receive an incoming call, but other functions will be inoperable, such as the ability to place a call.

In a multi-mode device where one of the devices comprises a camera, the sliding action of the display 104 may expose a camera lens in a camera mode and hide the camera lens when in another mode.

In some embodiments, the display may change orientation from one mode to another. For example, the display may be readable in a portrait orientation when in a telephony mode but may change to landscape orientation in a media player mode. In another example, the display may change orientation 180 degrees when the display is shifted from one position to another.

Some embodiments may include provisions to cover up or close the slots 115 and 116 when the device 102 is in the position 105. For example, a compliant membrane, a rubber flap, or some type of sliding closure may prevent dust and water from entering the body of the device 102 through the slots 115 and 116.

Figure 2:
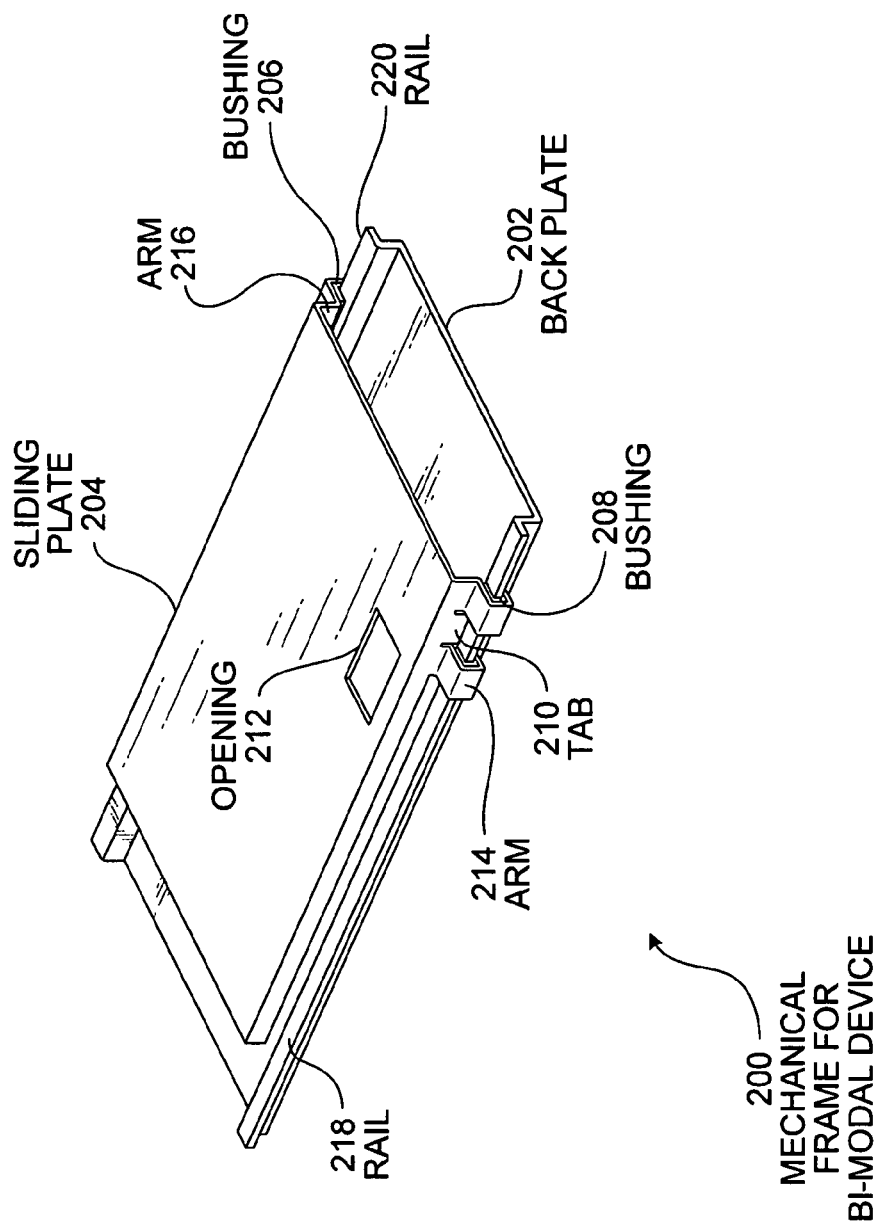
FIG. 2 is a perspective illustration of an embodiment showing a mechanical frame for a bi-modal device.

FIG. 2 illustrates an embodiment 200 of a mechanical frame for a bi-modal device. A back plate 202 has a sliding plate 204 mounted using bushings 206 and 208 mounted to arms 214 and 216, respectively. The bushings 206 and 208 slide on the rails 218 and 220, respectively. The sliding plate 204 has an opening 212 and a tab 210 that may be used to route electrical connections between devices that may be mounted to the sliding plate 204 and the back plate 202.

Embodiment 200 is an example of a frame that may be used for constructing the device 102. The back plate 202 and sliding plate 204 may slide with respect to each other so that the display, mounted to the sliding plate 204, may move from a first position where one of the keyboards is exposed, to a second position where the second keyboard is exposed. In the device 102, the arms 214 and 216 may extend through the slots 116 and 114, respectively.

Various components may be attached to the embodiment 200. For example, keyboards may be attached to the back plate 202 while a display may be attached to the sliding plate 204. Other components, such as batteries, connectors, printed circuit boards, speakers, microphones, etc may be mounted to the embodiment 200 in various configurations as desired.

The back plate 202 and sliding plate 204 may be manufactured from any suitable material, including stamped sheet metal, molded plastic, or any other material. In some cases, the back plate 202 and sliding plate 204 may have various mounting devices, hardware, clips, or features for attaching electrical or mechanical components. Some or all of the functions of the back plate 202 and sliding plate 204 may be incorporated into other components. For example, a printed circuit board may be incorporated into the back plate 202 or a display may be incorporated into the sliding plate 204 as opposed to being separate pieces that are mechanically fastened together.

The bushings 206 and 208 may be formed of plastic, metal, or any material that can withstand sliding forces and/or reduce noise. In some embodiments, separate bushings 206 and 208 may not be used when the sliding plate 204 and back plate 202 are constructed of a material and with a method whereby the two plates may slide with respect to each other in a free and easy manner.

Figure 3:
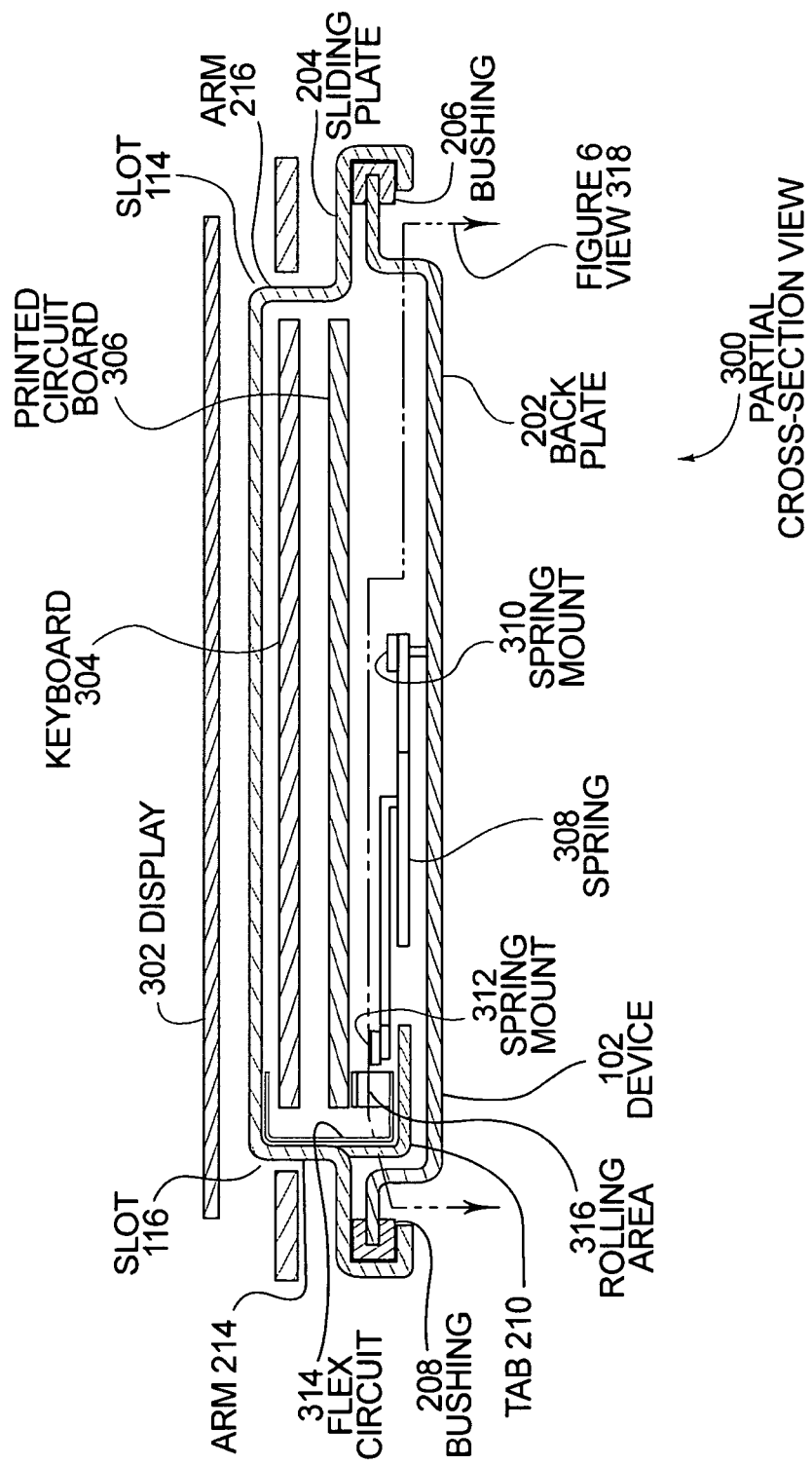
FIG. 3 is a partial cross-sectional view of an embodiment showing a device with a display that moves above a keyboard.

FIG. 3 is a partial cross section illustration showing an embodiment 300 of the device 102. The device 102 is illustrated with many components not shown for clarity. The sliding plate 204 and back plate 202 are shown mechanically connected through the bushings 206 and 208. A display 302 is mounted to the sliding plate 204, with the arms 214 and 216 going through slots 116 and 114, respectively, of the keyboard 304. Beneath the keyboard 304 is a printed circuit board 306. A spring 308 is mounted to the back plate 202 at spring mount 310 and to the sliding plate 204 at spring mount 312. A flex circuit 314 may connect the display 302 to the printed circuit board 306 through the rolling area 316.

The keyboard 304 and printed circuit board 306 may be mechanically attached to the back plate 202. In some instances, the keyboard 304 may serve as the two keyboards 108 and 110 shown in FIG. 1. In other instances, the keyboards 108 and 110 may be two separate, independent pieces. In such cases, the two separate keyboards may have different types or styles of key switches and may be placed at different heights with respect to the back plate 202.

Figure 4:
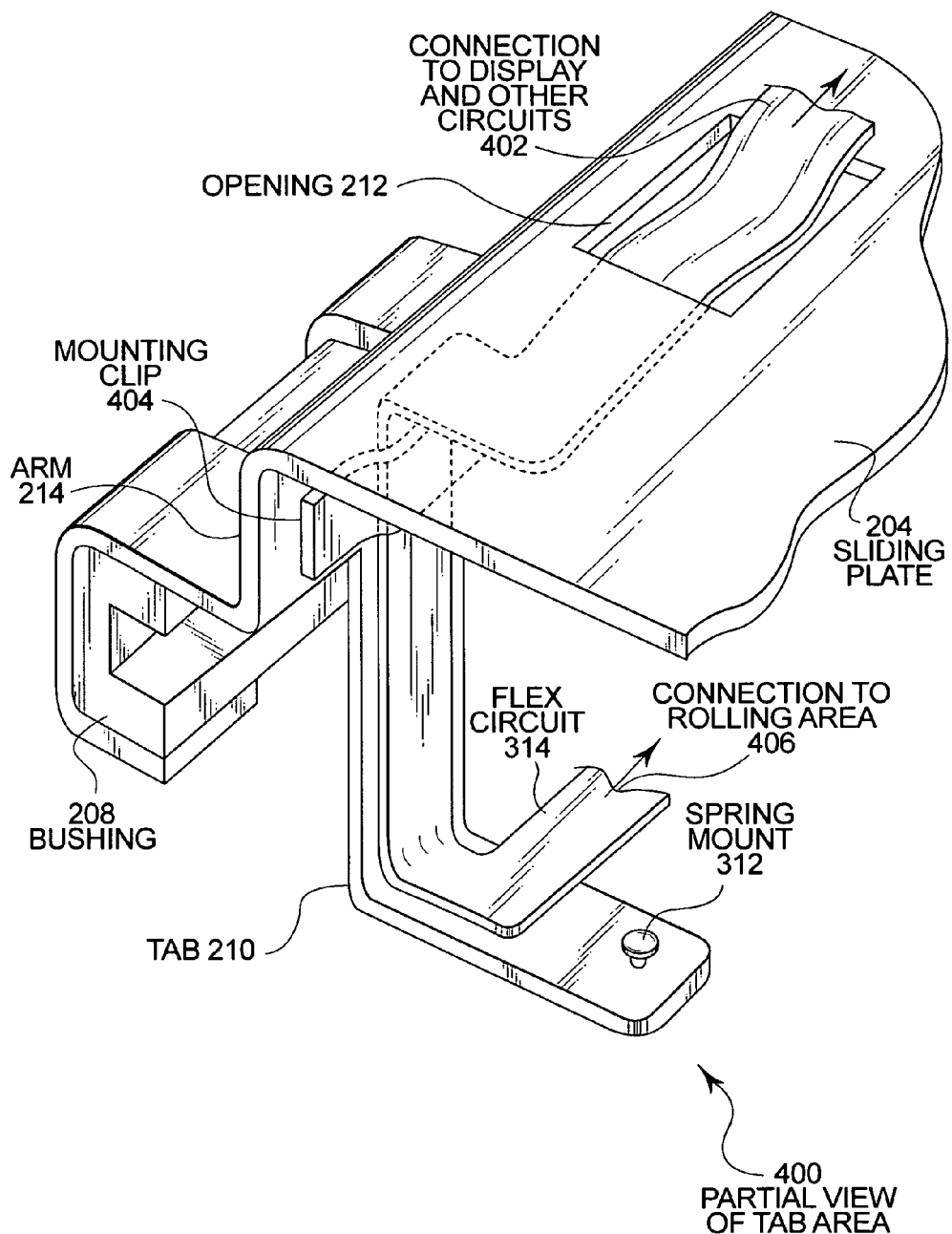
FIG. 4 is a perspective illustration of an embodiment showing a partial view of a tab area used to provide electrical connection between a moving portion and a fixed portion of a bi-modal device.

FIG. 4 is a perspective illustration of an embodiment 400 of the tab area. A portion of the sliding plate 204 is shown with arm 214, tab 210, and bushing 208. Through the opening 212, the flex circuit 314 may extend to connect the end 402 to a display. The flex circuit 314 may follow the underside of the sliding plate 204, be routed along the vertical portion of the tab 210, and turn to the end 406 that connects to a rolling portion of the flex circuit 314. At the end of the tab 210 is the spring mount 312.

The flex circuit 314 may be attached to the sliding plate 204 by a mounting clip 404. In some embodiments, the mounting clip 404 may be mechanically fastened, press fit, or attached by adhesive. Various other configurations of mechanical attachment clips or mechanisms may be used to hold and orient the flex circuit 314 against the tab 210. In some embodiments, a clip 404 may be replaced by adhesive.

Figure 5:
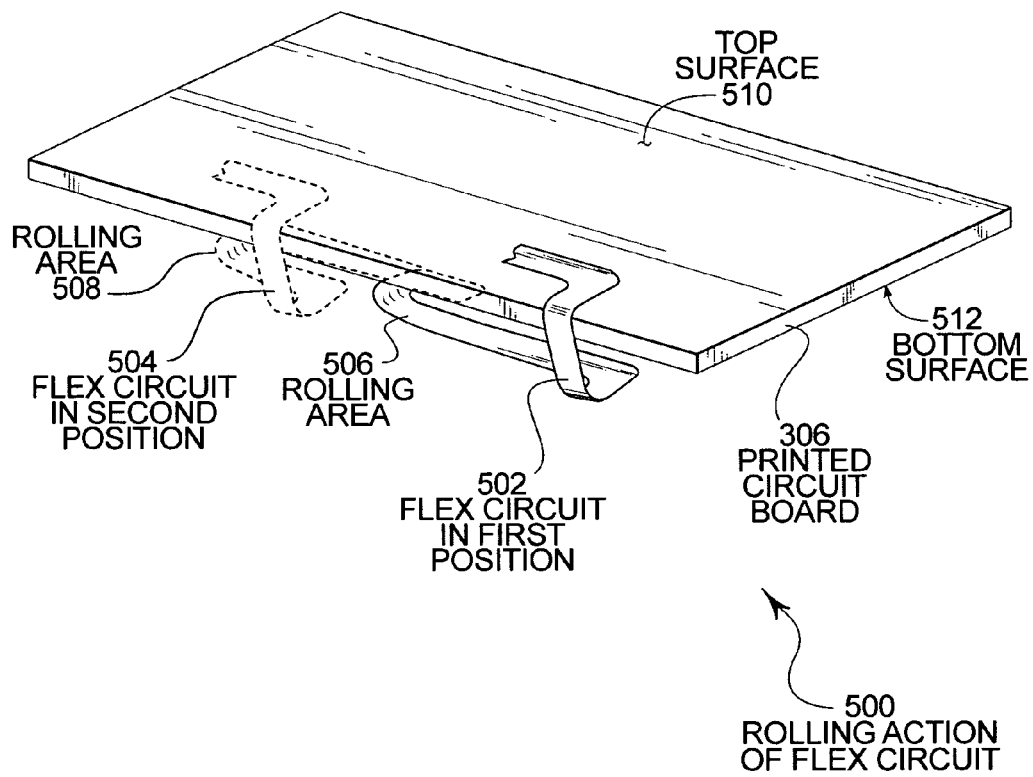
FIG. 5 is a perspective illustration of an embodiment showing a rolling action of a flex circuit.

FIG. 5 is a perspective illustration of an embodiment 500 showing the rolling action of a flex circuit. The printed circuit board 306 is shown with a top surface 510 and a bottom surface 512. The flex circuit is shown in a first position 502 with the rolling area 506. The flex circuit is shown in a second position 504 with the corresponding rolling area 508.

Embodiment 500 illustrates how a flex circuit may roll back and forth to make continuous reliable electrical connections between devices mounted on a sliding plate 204 to electrical devices mounted on a back plate 202. The flex circuit may be manufactured from any type of electrical connector that is capable of flexing or bending. In many cases, a printed circuit having multiple conductors and may be some electrical devices may be made using polyimide or other type of film.

Figure 6:
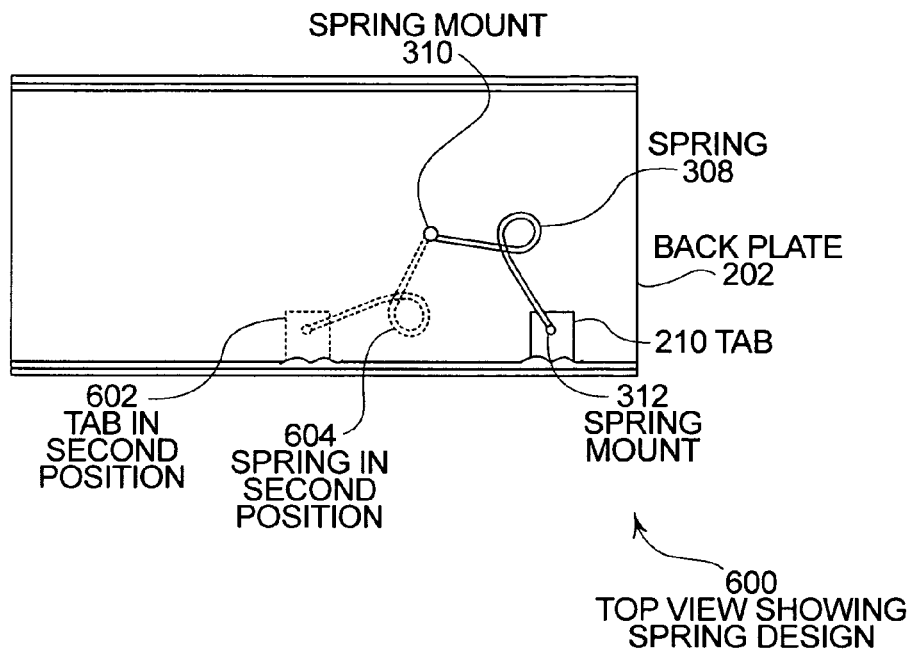
FIG. 6 is a top view illustration of an embodiment showing a spring mechanism for holding a bi-modal device in one of two positions.

FIG. 6 is a top view illustration showing an embodiment 600 of a spring design. FIG. 6 is a view described by line 318 in FIG. 3. The back plate 202 is shown with spring mount 310 and spring 308. The bottom portion of tab 210 is shown with spring mount 312. The tab 602 is shown when the sliding plate 204 is placed in a second position, which causes the spring to be in a second position 604.

The mechanism of embodiment 600 is one mechanism by which a spring may exert some force to hold the sliding plate 202 in either extreme end of travel. The spring 308 may be a wound wire torsional spring, leaf spring, compression spring, or other spring design. Various wire spring designs may be used depending on the application.

The mechanism operates by exerting a spring force acting to force the spring mount 310 away from the tab 210. Such a force will press the sliding plate 204 against a stop at either end of travel. In between the position of tab 212 and 602, the spring 308 may exert force against the sliding plate 204 as the sliding plate 204 is moved toward a midpoint of the travel. After the midpoint of travel, the spring 308 may begin to exert force that pushes the sliding plate 204 forward to the far end of travel. Thus, the sliding plate 204 may tend to snap to the end of travel and be held by the spring mechanism.

Figure 7:
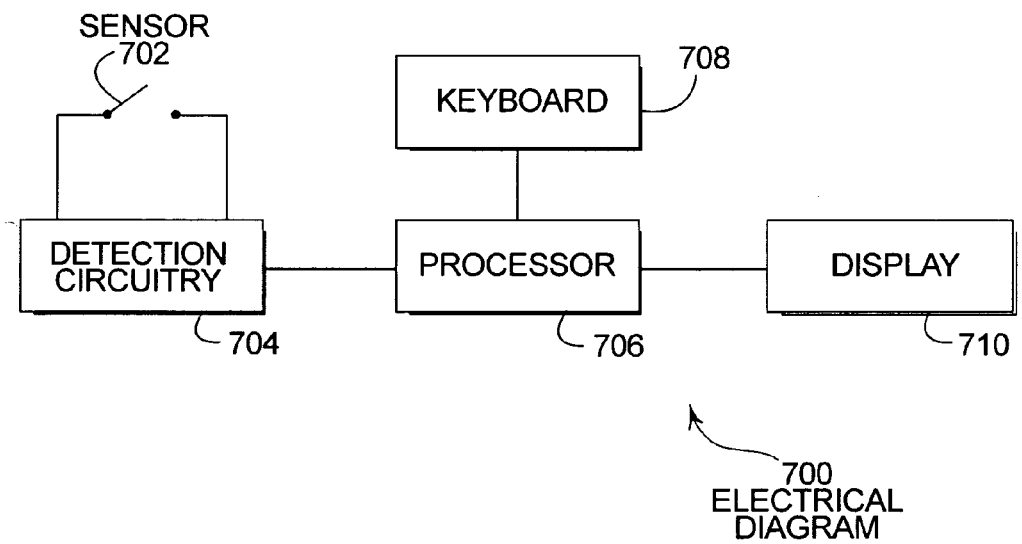
FIG. 7 is a functional illustration of an embodiment showing a bi-modal device.

FIG. 7 illustrates an embodiment 700 of an electrical diagram of a bi-modal device. A sensor 702 coupled with detection circuitry 704 may be used to detect when a display is positioned. The detection circuitry 704 is connected to a processor 706 that receives input from a keyboard 708 and sends output to a display 710.

The embodiment 700 illustrates how a device 102 may function. One or more sensors 702 may detect when the display 104 is positioned in one or both of the positions illustrated in views 105 and 107. Based on the position of the display 104, the keyboard inputs 708 may be interpreted in specific ways and the display 710 may be configured in various modes.

In some embodiments, a single sensor 702 may be used to detect if the display 104 is in either the first position 103 or second position 105. If the sensor 702 does not detect anything, the display 104 may be assumed to be in the other position. In other embodiments, two sensors may be used to detect that the display 104 is in either the first position 103 or the second position 105.

The processor 706 may be a programmable microprocessor, state machine, hard wired logic, or any other circuit that is capable of processing input and generating a display. In some cases, the processor 706 may be a very high powered computational device while in other cases much less complexity is used.

The keyboard 708 may be a single keyboard that contains both the phone keyboard 108 and the media player keyboard 110 in the embodiment 100. In other cases, the keyboard 708 may comprise two separate and distinct keyboards. In some embodiments, the processor 706 may recognize key presses from only one active keyboard at a time.

A bi-modal device may change functions or other qualities by sliding a display from one position to another. In each position, at least a portion of one keyboard may be covered while another keyboard may be exposed. A sliding plate may be attached to a back plate in a manner that enables mechanical and electrical connection between the two portions of the device while keeping the bi-modal functionality.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A device comprising:
   a back plate having at least two guides;
   a first keyboard mounted to said back plate, said first keyboard having a top side having keys and a bottom side opposite to said top side;
   a second keyboard mounted to said back plate, said second keyboard having a top side having keys and a bottom side opposite to said top side;
   a sliding plate comprising:
      a mounting area for a display;
      at least two legs engageable to said at least two guides such that said first keyboard is exposed and said second keyboard covered in a first position, and said second keyboard exposed and said first keyboard covered in a second position; and
      an electrical connection routed along one of said at least two legs and rolls offset from said bottom side of at least one of said first keyboard or said second keyboard.

2. The device of claim 1 wherein said first keyboard and said second keyboard are portions of a single keyboard.

3. The device of claim 1 further comprising:
   a spring providing a retaining force to hold said sliding plate in at least one of said first position and said second position.

4. The device of claim 3 wherein said spring is further providing a retaining force in both said first position and said second position.

5. The device of claim 1 further comprising:
   a printed circuit board mounted offset from said bottom side of said keyboards.

6. The device of claim 1 further comprising:
   an electronic sensor able to detect that said display is in at least one of said first position or said second position.

7. The device of claim 6 wherein said electronic sensor comprises a mechanical switch.

8. The device of claim 6 further comprising:
   a processor operating executable code changeable from a first mode of operating to a second mode of operating based on said electronic sensor.

9. The device of claim 8 wherein said first mode of operating comprises telephony.

10. The device of claim 8 wherein said second mode of operating comprises a media player.

11. The device of claim 1 further comprising:
    at least one key mounted on said sliding plate.

12. A device comprising:
    a first keyboard operates said device in a first mode;
    a second keyboard operates said device in a second mode;
    a display moveable from a first position to a second position, said first position exposing said first keyboard and hiding said second keyboard, said second position exposing said second keyboard and hiding said first keyboard;
    a back plate having at least two guides and mounts said first keyboard and said second keyboard;
    a sliding plate comprising:
       a mounting area for said display;
       at least two legs engaging said at least two guides; and
       an electrical connection routed along one of said at least two legs and connecting said display to said first keyboard and said second keyboard.

13. The device of claim 12 wherein said first keyboard and said second keyboard are portions of a single keyboard.

14. The device of claim 12 further comprising:
    a spring providing a retaining force to hold said sliding plate in at least one of said first position and said second position.

15. The device of claim 14 wherein said spring is further able to provide retaining force in both said first position and said second position.

16. The device of claim 12 further comprising:
    an electronic sensor detecting that said display is in at least one of said first position or said second position.

17. The device of claim 16 wherein said electronic sensor comprises a mechanical switch.

18. The device of claim 16 further comprising:
    a processor operating executable code for changing from a first mode of operating to a second mode of operating based on said electronic sensor.

19. The device of claim 18 wherein said first mode of operating comprises telephony.

20. A method comprising:
    assembling a first keyboard to a back plate, said back plate having at least two guides, said first keyboard having a top side having keys and a bottom side opposite to said top side;
    assembling a second keyboard to said back plate, said second keyboard having a top side having keys and a bottom side opposite to said top side;
    mounting a display to a sliding plate, said slide plate comprising at least two legs engaging said at least two guides such that said first keyboard may be exposed and said second keyboard covered in a first position, and said second keyboard exposed and said first keyboard covered in a second position; and
    making an electrical connection from said display to said first keyboard, said electrical connection being routed along one of said at least two legs and offset from said bottom side of at least one of said first keyboard or said second keyboard.

* * * * *